US012792504B2

(12) United States Patent
Gondaliya et al.

(10) Patent No.: US 12,792,504 B2
(45) Date of Patent: Nov. 10, 2026

(54) ZERO SPACE COST HARDWARE MEMORY ALLOCATION

(71) Applicant: Microsoft Technology Licensing, LLC, Redmond, WA (US)

(72) Inventors: Vishalkumar Shantilal Gondaliya, Lynnwood, WA (US); Amanda Elaine Anderson, Seattle, WA (US); Narayanan Ravichandran, Bothell, WA (US); Tian Tan, Bellevue, WA (US); Taylor Catherine Swanson, Bellevue, WA (US); Anshuman Verma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/212,182

(22) Filed: May 19, 2025

(65) Prior Publication Data

US 2026/0319943 A1 Oct. 15, 2026

Related U.S. Application Data

(60) Provisional application No. 63/787,444, filed on Apr. 11, 2025.

(51) Int. Cl.
*G06F 12/02* (2006.01)

(52) U.S. Cl.
CPC .................................. *G06F 12/023* (2013.01)

(58) Field of Classification Search
CPC ...................................................... G06F 12/023
USPC .......................................................... 711/154
See application file for complete search history.

(56) References Cited

U.S. PATENT DOCUMENTS

| | | | | |
|---|---|---|---|---|
| 10,901,887 | B2 | 1/2021 | Jacob | |
| 2013/0061009 | A1 | 3/2013 | Kumar | |
| 2022/0138095 | A1 * | 5/2022 | Jain | G06F 3/0608 711/171 |

* cited by examiner

*Primary Examiner* — Hua J Song
(74) *Attorney, Agent, or Firm* — Ray Quinney & Nebeker P.C.

(57) ABSTRACT

A hardware memory allocator of a compute system is described. The allocator stores batches of free identifiers (IDs) as elements of a linked list in a memory external to the system, each free ID identifying a respective segment of the memory, and transfers batch(es) of free IDs from the head of the linked list to an internal buffer. The allocator then responds to memory requests by allocating free IDs from among the batch(es) of free IDs in the buffer and to memory deallocation requests by deallocating previously-allocated free IDs. The allocator transfers batches of deallocated free IDs from the buffer to the head of the linked list, wherein transferring a batch of deallocated free IDs includes selecting one of the deallocated free IDs in the buffer exclusive of the batch and storing the batch of at the memory segment identified by the selected deallocated free ID.

20 Claims, 10 Drawing Sheets

ZERO SPACE COST HARDWARE MEMORY ALLOCATION

CROSS-REFERENCE TO RELATED APPLICATIONS

This application claims priority to U.S. Provisional Patent Application No. 63/787,444, filed Apr. 11, 2025, the entirety of which is incorporated by reference herein.

BACKGROUND

Memory allocation refers to a process by which specific areas of memory are assigned for use by executing computer programs. Memory allocation is a critical aspect of memory management, which involves allocating, deallocating, and managing memory resources to ensure efficient and reliable program execution.

Existing memory allocation solutions, whether implemented in hardware or software, often struggle with achieving both high performance and space efficiency, with many relying on bit vectors or tree structures to track free memory. For these types of solutions, allocating and deallocating memory requires traversing the bit vector or tree structure and modifying states along the traversal, resulting in multiple memory accesses and complex state tracking. This adds complexity and latency. Additionally, many memory allocation solutions typically require reserved memory for their operation. For example, metadata such as the bit vector or tree structure typically must be stored in a reserved memory area, thus imposing a non-trivial storage cost and reducing the total available memory for computation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hardware memory allocator of a compute system is described herein. In an implementation, the hardware memory allocator stores batches of free identifiers (IDs) as elements of a linked list in a memory external to the compute system, wherein each free ID identifies a respective memory segment of the memory, and then transfers one or more batches of free IDs from the head of the linked list to an internal buffer. The hardware memory allocator then responds to memory requests received from one or more requestors within the compute system by allocating free IDs from among the one or more batches of free IDs in the buffer to the one or more requestors and responds to memory deallocation requests from the one or more requestors by deallocating previously-allocated free IDs. The hardware memory allocator then transfers batches of the deallocated free IDs from the buffer to the head of the linked list, wherein transferring a batch of the deallocated free IDs includes selecting one of the deallocated free IDs in the buffer exclusive of the batch of the deallocated free IDs and storing the batch of the deallocated free IDs at the memory segment identified by the selected deallocated free ID.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
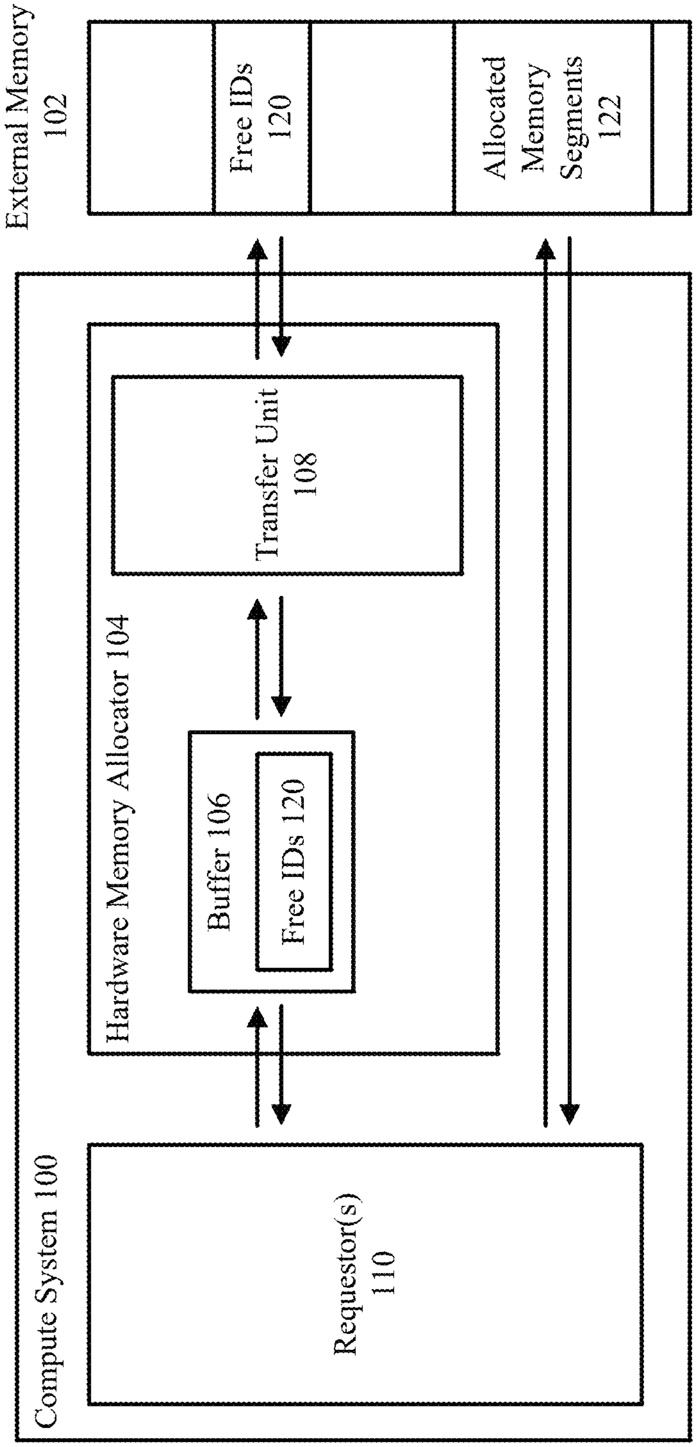
FIG. 1 shows a block diagram of a compute system that utilizes an external memory to which it is connected and that includes a hardware memory allocator according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Existing memory allocation solutions, whether implemented in hardware or software, often struggle with achieving both high performance and space efficiency. Many rely on bit vectors or tree structures to track free memory. For these types of solutions, allocating and deallocating memory requires traversing the bit vector or tree structure and modifying states along the traversal, resulting in multiple memory accesses and complex state tracking. This adds complexity and latency. Additionally, many memory allocation solutions typically require reserved memory for their operation. For example, metadata such as the bit vector or tree structure typically must be stored in a reserved memory area, thus imposing a non-trivial storage cost and reducing the total available memory for computation.

To address these and other issues of conventional memory management solutions, embodiments of a hardware memory allocator of a compute system are described herein. The hardware memory allocator stores batches of free IDs as elements of a linked list in a memory external to the compute system, wherein each free ID identifies a respective memory segment of the memory, and then transfers one or more batches of free IDs from the head of the linked list to an internal buffer. The hardware memory allocator then responds to memory allocation requests from one or more requestors within the compute system by allocating free IDs from the buffer to the one or more requestor(s) and responds to memory deallocation requests from the requestor(s) by deallocating previously-allocated free IDs. The hardware memory allocator then transfers batches of the deallocated free IDs from the buffer to the head of the linked list as needed, wherein the batches of free IDs transferred back to the external memory are stored in memory segments that are deemed to be deallocated by the hardware memory allocator.

In accordance with disclosed embodiments, free memory may be tracked using a stack of free IDs that identify respective fixed-size memory segments in the external memory. Memory allocation may thus simply entail popping a free ID off the stack while memory deallocation may simply entail pushing a free ID back onto the stack. Such an approach avoids reliance on bit vectors or tree structures to track free memory, which as noted above must be traversed and modified each time memory is allocated or deallocated. Thus, embodiments described herein can track free memory in a manner that requires significantly fewer memory accesses and significantly less computation as compared to approaches that rely on bit vectors or tree structures, thereby reducing complexity and latency.

In further accordance with the disclosed embodiments, the hardware memory allocator stores batches of free IDs from external memory to an internal buffer and then uses the internal buffer for free ID allocation and deallocation. By using a hardware buffer (e.g., an on-chip block random access memory (BRAM)) to perform memory allocation and deallocation, embodiments described herein can perform memory allocation and deallocation operations at a high speed and with low (e.g., ultra-low) latency, for example at the nanosecond level.

In still further accordance with disclosed embodiments, the hardware memory allocator stores batches of free IDs as elements of a linked list in external memory and only returns batches of deallocated free IDs back to external memory segments that are determined to be deallocated. This allows the hardware memory allocator to store the batches of free IDs only in unallocated or deallocated portions of the external memory which may be distributed throughout the external memory. Since the linked list of free IDs is always stored in unallocated or deallocated portions of the external memory, the free IDs can be stored in the external memory without reducing the total available memory for computation (i.e., at zero cost).

These advantages of the present embodiments are only illustrative, and other advantages are discussed in greater detail throughout this disclosure. Such embodiments are implemented in various ways to perform memory allocation.

For instance, FIG. 1 shows a block diagram of a compute system 100 that utilizes an external memory 102 to which it is connected and that includes a hardware memory allocator 104 according to an example embodiment. Compute system 100 may comprise a hardware-implemented compute system. For example, compute system 100 may comprise an integrated circuit (IC), such as a field programmable gate array (FPGA), an application-specific integrated circuit (ASIC), a microprocessor, a system-on-chip (SOC), or the like. However, these examples are not intended to be limiting and compute system 100 may comprise any system configured to perform computational tasks.

In addition to hardware memory allocator 104, compute system 100 includes one or more requestors 110. Each requestor 110 comprises a subsystem, circuit block, or other component of compute system 100 that is configured to perform certain computational tasks. Each requestor 110 is configured to carry out its respective computational tasks, in part, by allocating and deallocating segments of memory within external memory 102. Hardware memory allocator 104 is connected between requestor(s) 110 and external memory 102 and is configured to facilitate such allocating and deallocating. In particular, each requestor 110 is configured to request an allocation of memory segments through hardware memory allocator 104, use the memory segments allocated to it by hardware memory allocator 104 for its computation (e.g., by storing data in the memory segments), and then eventually deallocate the memory segments through hardware memory allocator 104. In FIG. 1, the memory segments of external memory 102 that are allocated to requestor(s) 110 by hardware memory allocator 104 are generally represented as allocated memory segments 122. Although these memory segments are shown as a contiguous block for the sake of simplicity, it is to be understood that allocated memory segments 122 may comprise memory segments that are not physically next to each other in external memory 102.

Hardware memory allocator 104 is designed for a scenario in which every allocation request will ask for a fixed-size amount of memory. In accordance with such a scenario, external memory 102 can be viewed as a list of fixed-sized memory chunks or segments. Unique IDs (e.g., addresses) are respectively assigned to each memory segment. For example, unique IDs may be respectively assigned to each memory segment starting from 0. Hardware memory allocator 104 maintains a list of free IDs 120 to track unallocated memory segments. Unallocated memory segments include both memory segments that have not yet been allocated to a requestor 110 as well as memory segments that have been allocated to a requestor 110 but then subsequently deallocated by that requestor 110.

Depending upon the implementation, storing the list of free IDs 120 may require non-trivial space. For example, to manage a 1 GB memory with a 1 KB memory segment size, 1 million unique IDs would be required, with 20-bits each to encode an ID between 0 and 1 million. In accordance with this example, 2.5 MB of memory space would be required to store the entire list of free IDs 120. In certain implementations, the entire list of free IDs 120 may be stored in external memory 102. In accordance with one design approach, this space must be reserved on an ongoing basis and therefore the total available space for requestor(s) 110 would be less than 1 GB. In contrast, embodiments described herein leverage the fact that when more memory segments are allocated, the number of free IDs is reduced, and if all memory segments are allocated, the number of free IDs reduces to 0. Embodiments described herein carefully specify where to store the free IDs in external memory 102 such that there is zero space cost from hardware memory allocator 104.

FIG. 1 also shows the hardware architecture of hardware memory allocator 104 in accordance with an embodiment. In the example embodiment of FIG. 1, hardware memory allocator 104 comprises a buffer 106 and a transfer unit 108. Buffer 106 is connected to requestor(s) 110 and provides requestor(s) 110 with low latency access thereto. In one embodiment in which hardware memory allocator 104 comprises an FPGA, buffer 106 may comprise a block random-access memory (BRAM), such as a dual-port BRAM, although this example is not intended to be limiting. Transfer unit 108 is connected between buffer 106 and external memory 102, which in this scenario represents the memory under management. Buffer 106 may enable very low latency access (e.g., in the order of nanoseconds) as it avoids having to access the main body of the list of free IDs 120 stored in external memory 102 for most allocation and deallocation requests. Transfer unit 108 is configured to monitor the utilization of buffer 106. Transfer unit 108 is further configured to hoist or transfer free IDs to external memory 102 when a total number of free IDs stored in buffer 106 exceeds a high watermark threshold (e.g., when buffer 106 is almost full) and to refill buffer 106 with free IDs when the total number of free IDs stored in buffer 106 falls below a low watermark threshold (e.g., when buffer 106 is almost empty).

The following provides a non-limiting example of how requestor(s) 110 may interact with hardware memory allocator 104 to access external memory 102 in accordance with certain embodiments.

First, during an initialization stage, hardware memory allocator 104 initializes a full list of free IDs 120 in external memory 102, arranged in the form of a linked list. Although the linked list of free IDs 120 in external memory 102 is shown as a contiguous block in FIG. 1 for the sake of simplicity, it is to be understood that the batches of free IDs that make up the linked list may be stored in memory segments that are not physically next to each other in external memory 102.

After hardware memory allocator 104 initializes the full list of free IDs 120 in external memory 102, hardware memory allocator 104 then pre-loads a portion (e.g., a relatively small portion) of the list of free IDs 120 into buffer 106. The free IDs 120 in buffer 106 may be maintained in a stack.

After the initialization stage, requestor(s) 110 can start requesting memory from hardware memory allocator 104. In response to such requests, hardware memory allocator 104 returns free IDs from buffer 106 to requestor(s) 110. If a free ID is transferred to a requestor 110, that free ID is considered allocated.

As requestor(s) 110 continue to request free IDs, the number of free IDs in buffer 106 may fall below the low watermark threshold. The low watermark threshold may correspond, for example, to one quarter of the total free IDs that can be stored in buffer 106. Transfer unit 108 will detect that the number of free IDs has fallen below the low watermark threshold. For example, transfer unit 108 may receive a signal from buffer 106 that indicates that the total number of free IDs in buffer 106 has dropped below the low watermark threshold. In response to detecting this event, transfer unit 108 starts to read more free IDs from external memory 102 to replenish buffer 106.

As more memory is allocated, the portion of the list of free IDs 120 stored in external memory 102 takes up less space, and the space previously occupied by the list of free IDs 120 in external memory 102 is now available for allocation to requestor(s) 110.

When a requestor 110 is done with a memory segment, it returns the free ID associated with the memory segment to deallocate the memory segment. The free IDs returned in this manner by requestor(s) 110 are first pushed to buffer 106. As requestor(s) 110 continue to return free IDs to buffer 106, the number of free IDs in buffer 106 may rise above a high watermark threshold. The high watermark threshold may correspond, for example, to three quarters of the total free IDs that can be stored in buffer 106. Transfer unit 108 will detect that the number of free IDs has risen above the high watermark threshold. For example, transfer unit 108 may receive a signal from buffer 106 that indicates that the total number of free IDs in buffer 106 has risen above the high watermark threshold. In response, to detecting this event, transfer unit 108 moves a number of free IDs back to external memory 102.

Note that in an alternate embodiment, during the initialization phase, hardware memory allocator 104 may use an internal counter to incrementally generate free IDs to service allocation requests from requestor(s) 110 up to some predetermined maximum number of free IDs. Once the predetermined maximum number of free IDs has been reached, hardware memory allocator 104 may disable the internal counter and then perform allocation/deallocation using the free IDs in the linked list in external memory 102 in the manner previously described. In accordance with this alternate embodiment, there is no need to store a complete list of free IDs in external memory 102 during the initialization stage.

As noted above, in an embodiment, buffer 106 may comprise a dual-port BRAM. In accordance with such an embodiment, a first port of the dual-port BRAM may be used by requestor(s) 110 to allocate (read) or deallocate (write), and a second port of the dual-port BRAM may be used by transfer unit 108 to hoist or refill free IDs to or from external memory 102.

Buffer 106 may be used to improve the speed at which memory may be allocated and deallocated. For example, if buffer 106 was not included, any allocation or deallocation request would need to access the list of free IDs 120 stored in external memory 102. In a scenario in which external memory 102 is dynamic random-access memory (DRAM), such an access may incur hundreds of nanoseconds of latency. In contrast, by using buffer 106, allocation and deallocation can be done within one or two hardware clock cycles (a few nanoseconds) in accordance with certain embodiments.

As also noted above, in certain embodiments, buffer 106 implements two thresholds: a high watermark threshold and a lower watermark threshold. Exceeding the high watermark threshold may indicate, for example, that buffer 106 is almost full. Falling below the low watermark threshold may indicate, for example, that buffer 106 is almost empty. The high watermark threshold may be set, for example, to three quarters full, and the low watermark threshold may be set, for example, to one quarter full, although these examples are by no means limiting. When the number of free IDs in buffer 106 is below the low watermark threshold, transfer unit 108 is triggered to replenish more free IDs from external memory 102 to buffer 106. This can help to ensure that buffer 106 can handle a burst of allocation requests. Similarly, when the number of free IDs in buffer 106 exceeds the high watermark threshold, transfer unit 108 is triggered to hoist free IDs to external memory 102 from buffer 106. This can help to ensure that buffer 106 can handle a burst of deallocation requests.

Figure 2B:
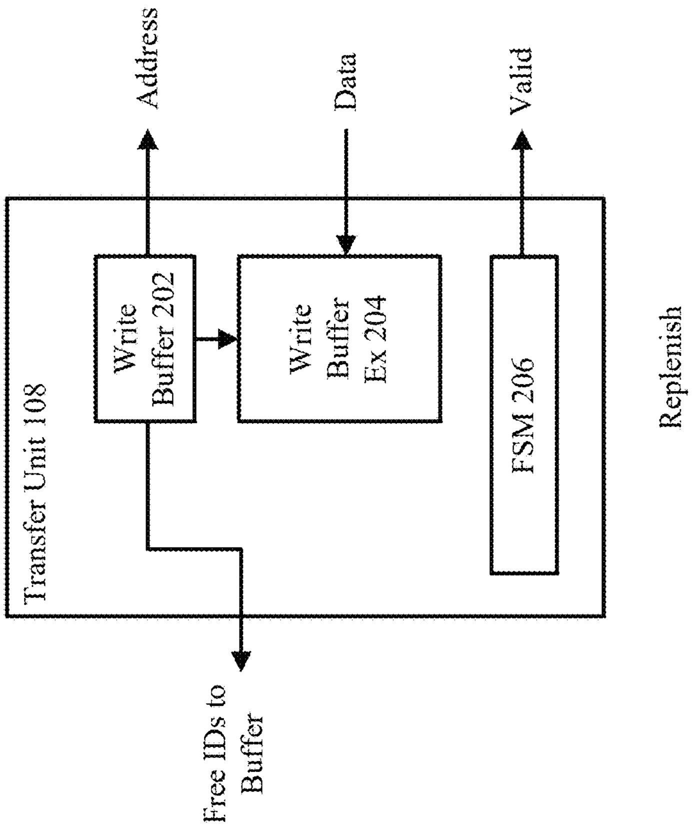
FIG. 2B is a block diagram that depicts an example transfer unit of the hardware memory allocator of FIG. 1 and its use in replenishing free IDs from the external memory to a buffer of the hardware memory allocator, according to an embodiment.
Figure 2A:
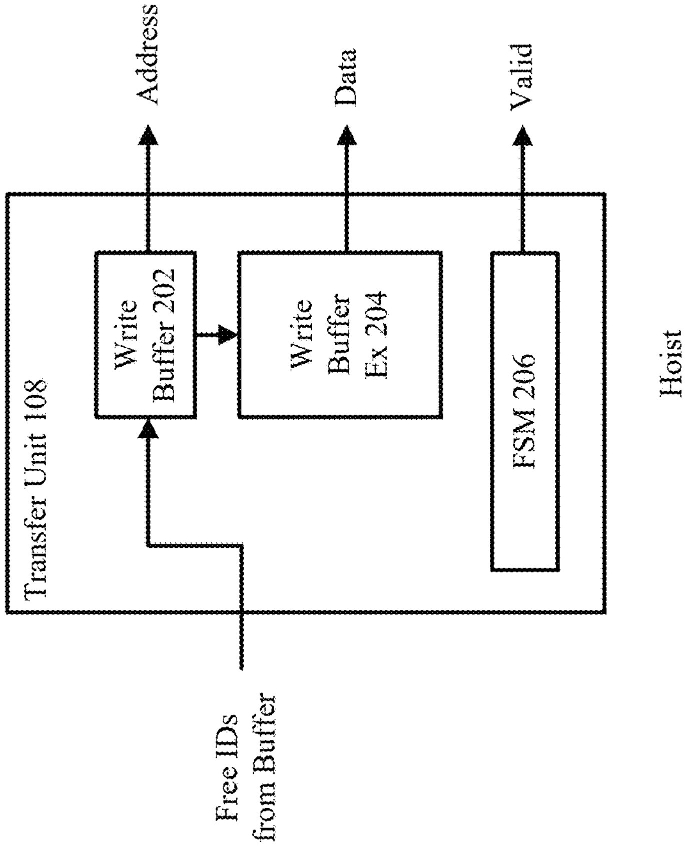
FIG. 2A is a block diagram that depicts an example transfer unit of the hardware memory allocator of FIG. 1 and its use in hoisting free IDs from a buffer of the hardware memory allocator to the external memory, according to an embodiment.

In embodiments, transfer unit 108 is configured to maintain a desired level of free IDs in buffer 106 and to organize the remaining free IDs into a linked list and store them in external memory 102. The linked list organization can enable embodiments to achieve zero space cost. FIG. 2A is a block diagram that shows one example implementation of transfer unit 108 and its use in hoisting free IDs from buffer 106 to external memory 102. FIG. 2B is a block diagram that shows the same example implementation of transfer unit 108 and its use in replenishing free IDs from external memory 102 to buffer 106.

In embodiments, free IDs are brought to or from external memory 102 in batches. In accordance with such embodiments, the batch size may depend on the memory segment size and the bit width of the unique free IDs. For example, with a 1 KB chunk size and 20 bits per free ID, each batch can hold 1K bits/20 bits=50 free IDs.

In accordance with the example embodiment shown in FIG. 2A, when transfer unit 108 is hoisting free IDs from buffer 106 to external memory 102, a finite state machine (FSM) 206 within transfer unit 106 causes free IDs to be pipelined from buffer 206 first to a write buffer 202, which can hold a single free ID, and then to a write buffer ex 204, which can hold a batch of free IDs (e.g., 50 free IDs in the 1 KB memory segment size example). After this pipelining operation is complete, FSM 206 performs a write to external memory in which the free ID stored in write buffer 202 (i.e., the last free ID read from buffer 106) is used as the write address and the batch of free IDs stored in write buffer ex 204 constitute the write data (i.e., the data written back to external memory 102). Then, during the next hoist operation, the free ID stored in write buffer 202 will be the first free ID to be shifted to write buffer ex 204 during the pipelining phase. By repeatedly carrying out this hoist operation, transfer unit 108 can construct a linked list of free IDs in external memory 102.

In further accordance with this example embodiment, at any point, the free ID stored in write buffer 202 indicates the head of the linked list in external memory 102. If buffer 106 drops below the low watermark threshold, then FSM 206 within transfer unit 108 will initiate a replenish operation. This entails issuing a read request to external memory 102 to read a batch of free IDs (e.g., 50 free IDs in the 1 KB memory segment size example) in which the free ID in write buffer 202 is used as the read address. The plurality of free IDs are read from external memory 102 into write buffer ex 204. The free IDs in write buffer ex 204 are then pipelined to buffer 106 through write buffer 202. However, the last free ID left in write buffer 202 is not moved to buffer 106. This free ID actually points to the new head of the linked list in external memory 102.

In still further accordance with this example embodiment, since any free ID in write buffer 202 is unallocated, it is safe to use the memory segment associated with such free ID to store a batch of free IDs. Similarly, once a batch of free IDs are read from the external memory 102, it's associated address/free ID is now free to use and may be moved to the buffer 106 as part of the aforementioned replenish operation.

One aspect of example hardware memory allocator 104 discussed above is that it assumes that all allocation requests will ask for the same fixed-size memory segment. While such an approach may cover a wide number (or even a vast majority) of usage scenarios, it may be deemed desirable to support the allocation of a few different sizes of memory segments (e.g., 1 KB, 2 KB and 4 KB). In this case, an extension of the previously described design may be used. One example of such an extended design will now be described in reference to FIGS. 3 and 4.

Figure 3:
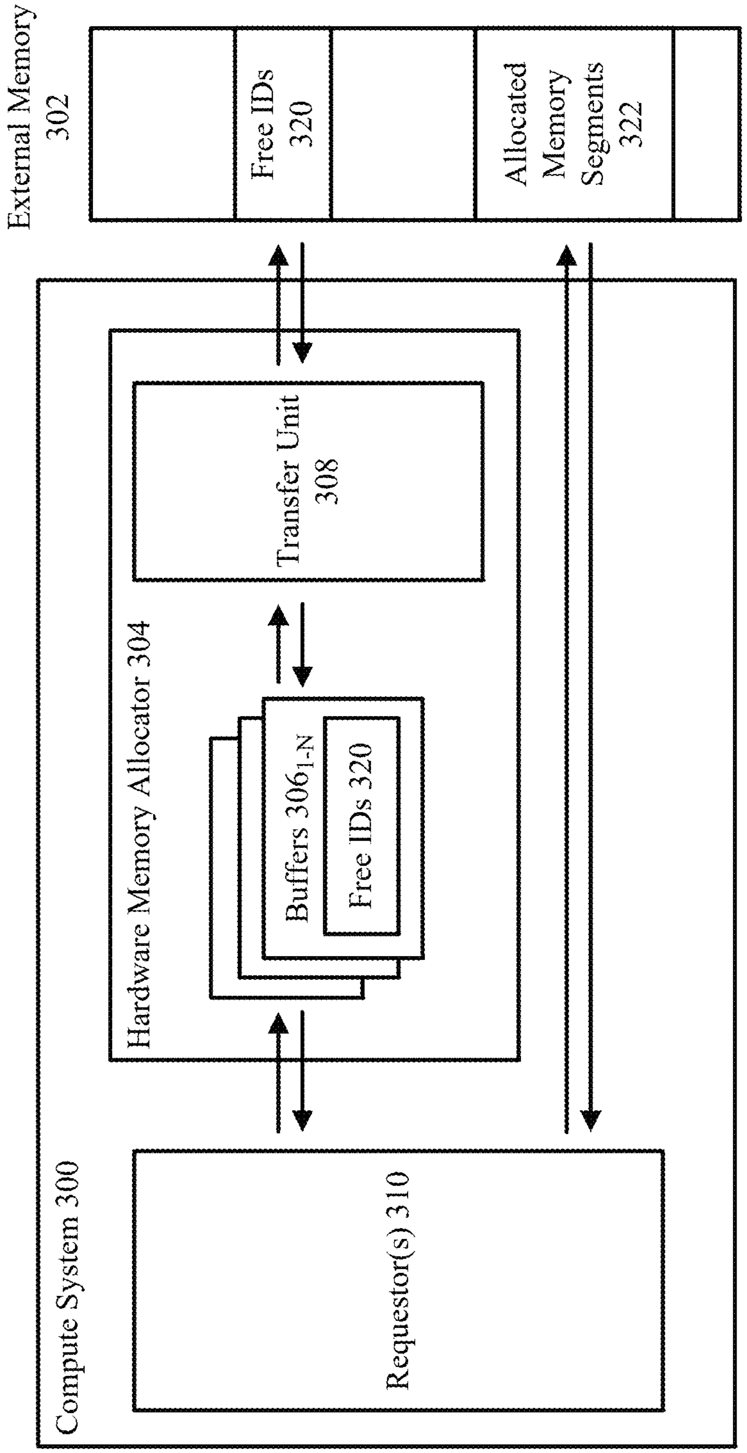
FIG. 3 is a block diagram of a compute system that utilizes an external memory and that includes a hardware memory allocator adapted to allocate memory segments of different sizes according to a further example embodiment.

In particular, FIG. 3 shows a block diagram of a compute system 300 that utilizes an external memory 302 and that includes a hardware memory allocator 304 adapted to allocate memory segments of different sizes according to a further example embodiment. In FIG. 3, compute system 300 and external memory 302 may be implemented using structurally similar components to those discussed above with respect to compute system 100 and external memory 102 of FIG. 1.

In accordance with the example embodiment of FIG. 3, external memory 302 is partitioned into multiple memory regions or tables, wherein each memory region or table has a different memory segment size (e.g., 1 KB, 2 KB and 4 KB in one example). Furthermore, each memory region or table may have a set of free IDs that start from some initial value (e.g., 0) and extend to some maximum number, wherein each free ID identifies a corresponding memory segment in external memory 302. A different linked list of free IDs 320 may be stored in external memory 302 for each memory segment size. Each linked list may be structured in a similar manner to the linked list described above with respect to the embodiment of FIG. 1. Memory segments allocated to requestor(s) 310 are generally represented as allocated memory segments 322. It is to be understood that the batches of free IDs that make up the linked lists of free IDs 320 in external memory 302 as well as allocated memory segments 322 may not be stored in contiguous memory segments.

Hardware memory allocator 304 is configured to allocate memory segments in external memory 302 to requestor(s)

310 by transferring free IDs thereto and to deallocate memory segments by receiving free IDs therefrom, in a like manner to that described above in reference to FIG. 1. However, in accordance with the example embodiment of FIG. 3, hardware memory allocator 304 includes a plurality of buffers $306_{1-N}$ (rather than a single buffer 106), wherein each buffer is respectively utilized to allocate or deallocate free IDs 320 corresponding to a different memory segment size. For example, a first buffer $306_1$ may be used to allocate or deallocate free IDs corresponding to 1 KB memory segments in external memory 302, a second buffer $306_2$ may be used to allocate or deallocate free IDs corresponding to 2 KB memory segments in external memory 302, while a third buffer $306_3$ may be used to allocate or deallocate free IDs corresponding to 4 KB memory segments in external memory 302. Thus, each buffer $306_{1-N}$ may correspond to a different memory region or table in external memory 302.

Figure 4:
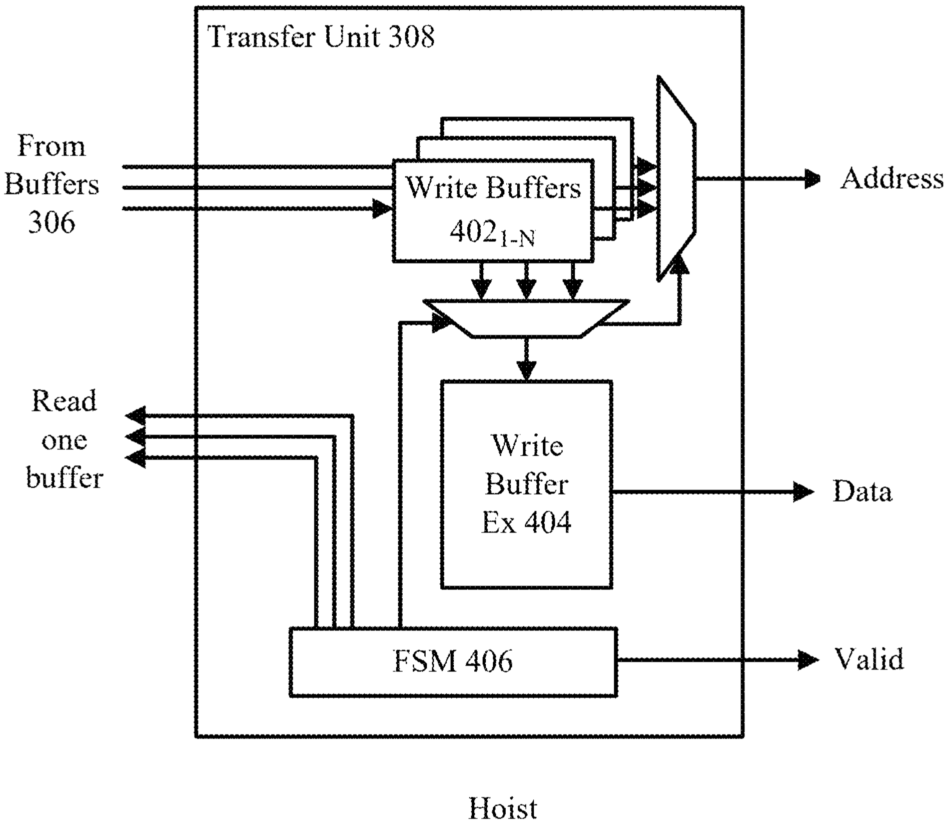
FIG. 4 is a block diagram that depicts an example transfer unit of the hardware memory allocator of FIG. 3 and its use in hoisting free IDs from buffers of the hardware memory allocator to the external memory, according to an embodiment.

FIG. 4 is a block diagram that depicts an example transfer unit 308 of hardware memory allocator 304 of FIG. 3 and its use in hoisting free IDs from buffers $306_{1-N}$ of hardware memory allocator 304 to external memory 302, according to an example embodiment. As shown in FIG. 4, transfer unit 308 includes a plurality of write buffers $402_{1-N}$, a shared write buffer ex 404, and an FSM 406. Each write buffer $402_{1-N}$ is utilized to facilitate a hoist operation from a corresponding buffer $306_{1-N}$, while shared write buffer ex 404 is utilized to facilitate hoist operations from all buffers $306_{1-N}$. In accordance with such an implementation, FSM 406 may monitor each of buffers $306_{1-N}$(e.g., in a round robin manner or in some other manner) to determine when a high watermark threshold associated with such buffer has been exceeded. When the high watermark threshold associated with one of buffers $306_{1-N}$ has been exceeded, FSM 406 will cause free IDs to be pipelined from that particular buffer through a corresponding write buffer $402_{1-N}$ into shared write buffer ex 404 and then carry out a write operation to external memory 302 in a manner similar to that described above with respect to FIG. 2A.

Likewise, FSM 406 may utilize each write buffer $402_{1-N}$ to facilitate a replenish operation into a corresponding buffer $306_{1-N}$, while utilizing shared write buffer ex 404 for replenish operations to all buffers $306_{1-N}$. For example, FSM 406 may monitor each of buffers $306_{1-N}$(e.g., in a round robin manner or in some other manner) to determine when the total number of free IDs stored therein has dropped below a low watermark threshold associated therewith. When this occurs, FSM 406 will utilize the free ID stored in the write buffer $402_{1-N}$ corresponding to the target buffer $306_{1-N}$ to read a batch of free IDs from external memory 302 into shared write buffer ex 404, and then pipeline the free IDs from shared write buffer ex 404 through the appropriate write buffer $402_{1-N}$ into the target buffer $306_{1-N}$ in a manner similar to that described above with respect to FIG. 2B.

In accordance with this approach, the free ID stored in each write buffer $402_{1-N}$ will point to the head of a different linked list in external memory 302 (e.g., a linked list of free IDs of 1 KB memory segments, a linked list of free IDs of 2 KB memory segments, and a linked list of free IDs of 4 KB memory segments) and to facilitate writes (hoists) thereto and reads (replenishments) therefrom.

To further illustrate the operation of the foregoing embodiments, FIGS. 5-10 will now be described.

Figure 5:
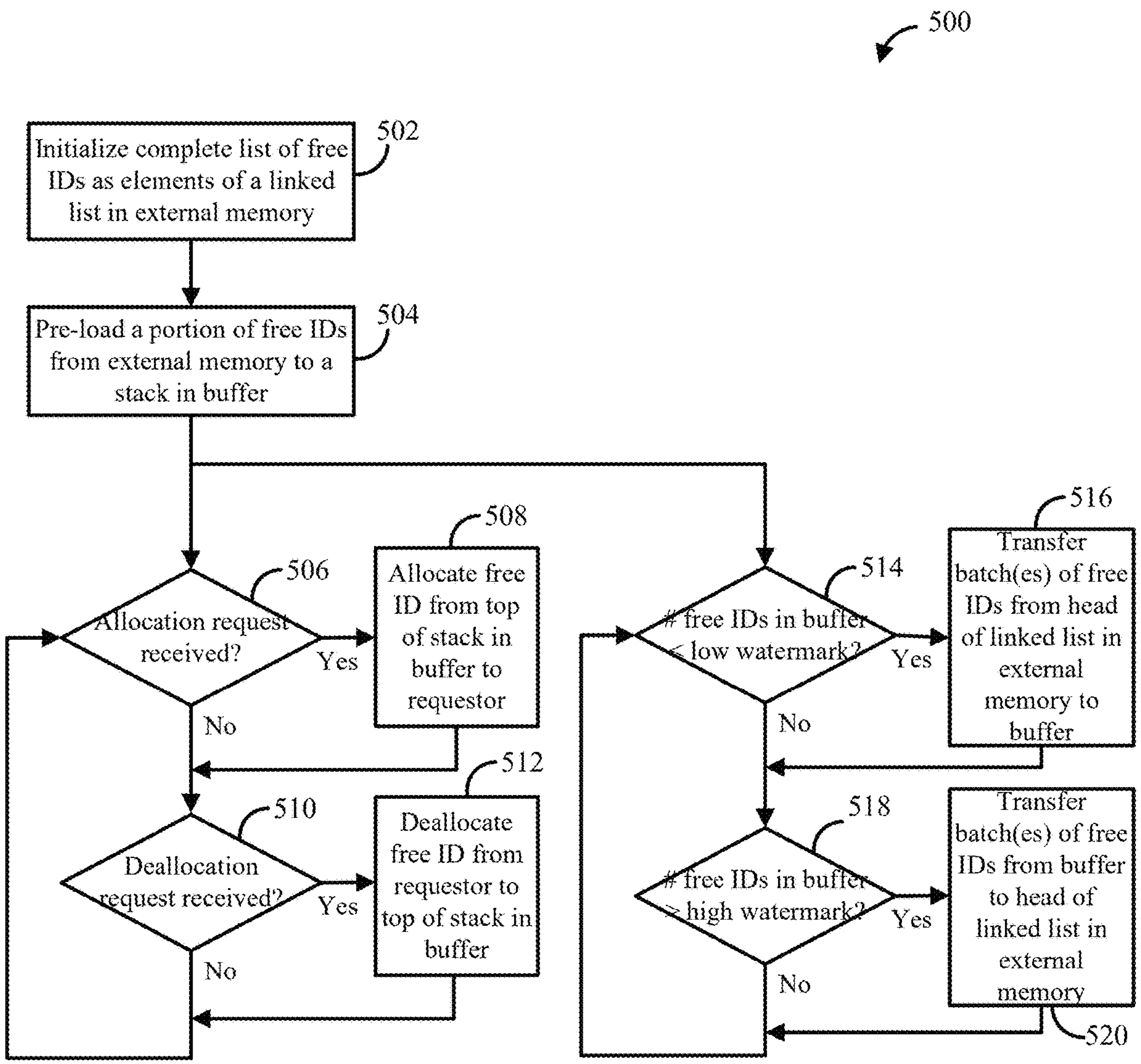
FIG. 5 shows a flowchart of a method for allocating memory by a hardware memory allocator of a compute system in accordance with an example embodiment.

In particular, FIG. 5 shows a flowchart 500 of a method for allocating memory by a hardware memory allocator of a compute system in accordance with an example embodiment. In an embodiment, the method of flowchart 500 is implemented by hardware memory allocator 104 of FIGS. 1 and 2. Accordingly, the method of flowchart 500 will be described with reference to FIGS. 1 and 2. Other structural and operational embodiments will be apparent to persons skilled in the relevant art(s) based on the following discussion regarding the method of flowchart 500 and hardware memory allocator 104 of FIGS. 1 and 2.

As shown in FIG. 5, the method of flowchart 500 begins at step 502 in which hardware memory allocator 104 initializes a complete list of free IDs 120 as elements or nodes of a linked list in external memory 102, wherein each free ID identifies a respective memory segment of external memory 102. Each element of the linked list comprises a batch of free IDs and is stored at a unique memory segment within external memory 102. Depending upon the implementation, a batch of free IDs may consist of a single free ID or a plurality of free IDs.

After step 502, control flows to step 504, in which hardware memory allocator 104 pre-loads a portion of free IDs from external memory 102 to buffer 106. Pre-loading the portion of free IDs from external memory 102 to buffer 106 comprises reading one or more batches of free IDs from a head of the linked list in external memory 102. The free IDs pre-loaded into buffer 106 are stored in a stack.

After step 504, an allocation/deallocation control loop is executed starting at decision step 506 and, substantially in parallel, a replenish/hoist control loop is executed starting at decision step 514.

As noted above, the allocation/deallocation control loop begins at decision step 506. During decision step 506, hardware memory allocator 104 determines if an allocation request has been received from a requestor 110. If hardware memory allocator 104 determines that an allocation request has been received from a requestor 110, then control flows to step 508. Otherwise, control flows to decision step 510.

At step 508, in response to determining that an allocation request has been received from a requestor 110, hardware memory allocator 104 allocates a free ID from the top of the stack in buffer 106 to the requestor 110. This may entail, for example, transferring the free ID from the top of the stack in buffer 106 to the requestor 110. After step 508, control flows to decision step 510.

At decision step 510, hardware memory allocator 104 determines if a deallocation request has been received from a requestor 110. If hardware memory allocator 104 determines that a deallocation request has been received from a requestor 110, then control flows to step 512. Otherwise, control returns to decision step 506.

At step 512, in response to determining that a deallocation request has been received from a requestor 110, hardware memory allocator 104 deallocates a free ID from the requestor 110 to the top of the stack in buffer 106. This may entail, for example, transferring the free ID from requestor 110 to the top of the stack in buffer 106. After step 512, control returns to decision step 506.

As noted above, the replenish/hoist control loop begins at decision step 514. During decision step 514, hardware memory allocator 104 determines if the total number of free IDs in buffer 106 has dropped below a low watermark threshold. If hardware memory allocator 104 determines that the total number free IDs in buffer 106 has dropped below the low watermark threshold, then control flows to step 516. Otherwise, control flows to decision step 518.

At step 516, in response to determining that the total number of free IDs in buffer 106 has dropped below the low watermark threshold, hardware memory allocator 104 transfers one or more batches of free IDs from a head of the linked list in external memory 102 to buffer 106. This step may be carried out, for example, by executing a replenish operation as described above in reference to FIG. 2B. After step 516, control flows to decision step 518.

At decision step 518, hardware memory allocator 104 determines if the total number of free IDs in buffer 106 has exceeded a high watermark threshold. If hardware memory allocator 104 determines that the total number free IDs in buffer 106 has exceeded the high watermark threshold, then control flows to step 520. Otherwise, control returns to decision step 514.

At step 520, in response to determining that the total number of free IDs in buffer 106 has exceeded the high watermark threshold, hardware memory allocator 104 transfers one or more batches of free IDs from buffer 106 to a head of the linked list in external memory 102. This step may be carried out, for example, by executing a hoist operation as described above in reference to FIG. 2A. After step 520, control returns to decision step 514.

As was previously discussed, in an alternate embodiment, hardware memory allocator 104 may not perform steps 502 and 504 of flowchart 500 which entail initializing a complete list of free IDs as elements of a linked list in external memory 102 and then preloading a portion of those free IDs into buffer 106 to service allocation requests. Rather, in such an alternate embodiment, hardware memory allocator 104 may use an internal counter to incrementally generate free IDs to service allocation requests from requestor(s) 110 up to some predetermined maximum number of free IDs during an initialization phase, and then, after the predetermined maximum number of free IDs has been reached, disable the internal counter and perform allocation/deallocation using the free IDs in the linked list in external memory 102.

Furthermore, although the method of flowchart 500 was described above with respect to hardware memory allocator 104 of FIGS. 1 and 2, it is to be understood that the method of flowchart 500 may also be performed by hardware memory allocator 304 of FIGS. 3 and 4. With respect to the embodiment of FIGS. 3 and 4, hardware memory allocator 304 may execute a separate instance of the method of flowchart 500 for each memory segment size supported by hardware memory allocator 304. Thus, for example, hardware memory allocator 304 may execute one instance of the method of flowchart 500 for 1 KB memory segments, another instance of the method of flowchart 500 for 2 KB memory segments, and yet another instance of the method of flowchart 500 for 4 KB memory segments.

Figure 6:
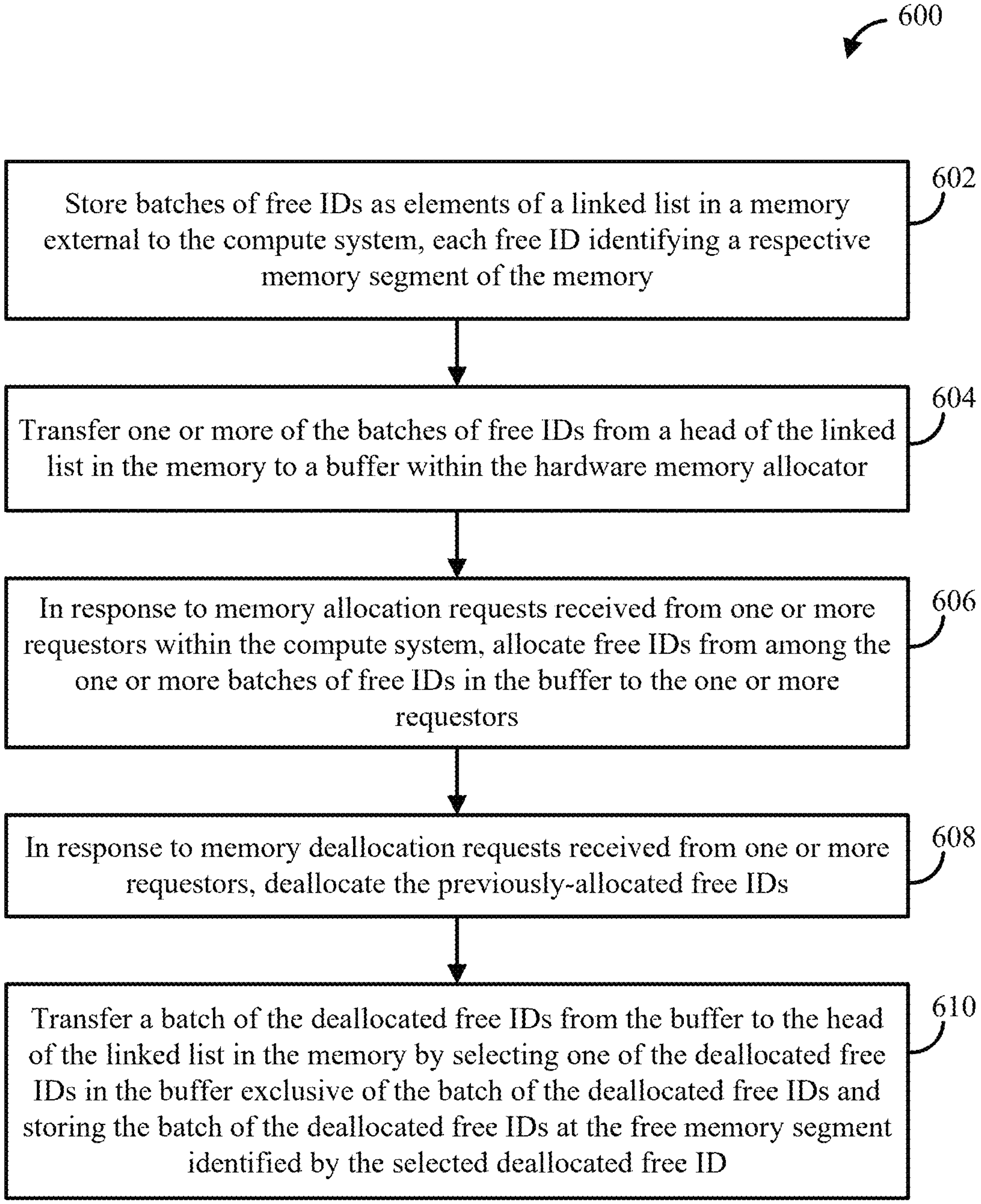
FIG. 6 shows a flowchart of a method for allocating memory by a hardware memory allocator of a compute system in accordance with an example embodiment.

FIG. 6 shows a flowchart 600 of a method for allocating memory by a hardware memory allocator of a compute system in accordance with an example embodiment. In an embodiment, the method of flowchart 600 is implemented by hardware memory allocator 104 of FIGS. 1 and 2. Accordingly, the method of flowchart 600 will be described with reference to FIGS. 1 and 2. Other structural and operational embodiments will be apparent to persons skilled in the relevant art(s) based on the following discussion regarding the method of flowchart 600 and hardware memory allocator 104 of FIGS. 1 and 2.

As shown in FIG. 6, the method of flowchart 600 begins at step 602 in which hardware memory allocator 104 stores batches of free IDs as elements of a linked list in external memory 102 external to compute system 100, wherein each free ID identifies a respective memory segment of external memory 102. After step 602, control flows to step 604.

At step 604, hardware memory allocator 104 transfers one or more of the batches of free IDs from a head of the linked list in external memory 102 to buffer 106 within hardware memory allocator 104. After step 604, control flows to step 606.

At step 606, in response to memory allocation requests received from one or more requestors 110 within compute system 100, hardware memory allocator 104 allocates free IDs from among the one or more batches of free IDs in buffer 106 to the one or more requestors 110. After step 606, control flows to step 608.

At step 608, in response to memory deallocation requests received from one or more requestors 110, hardware memory allocator 104 deallocates the previously-allocated free IDs. After step 608, control flow to step 610.

At step 610, hardware memory allocator 104 transfers a batch of the deallocated free IDs from buffer 106 to the head of the linked list in external memory 102 by selecting one of the deallocated free IDs in buffer 106 exclusive of the batch of the deallocated free IDs and storing the batch of the deallocated free IDs at the free memory segment identified by the selected deallocated free ID.

Figure 7:
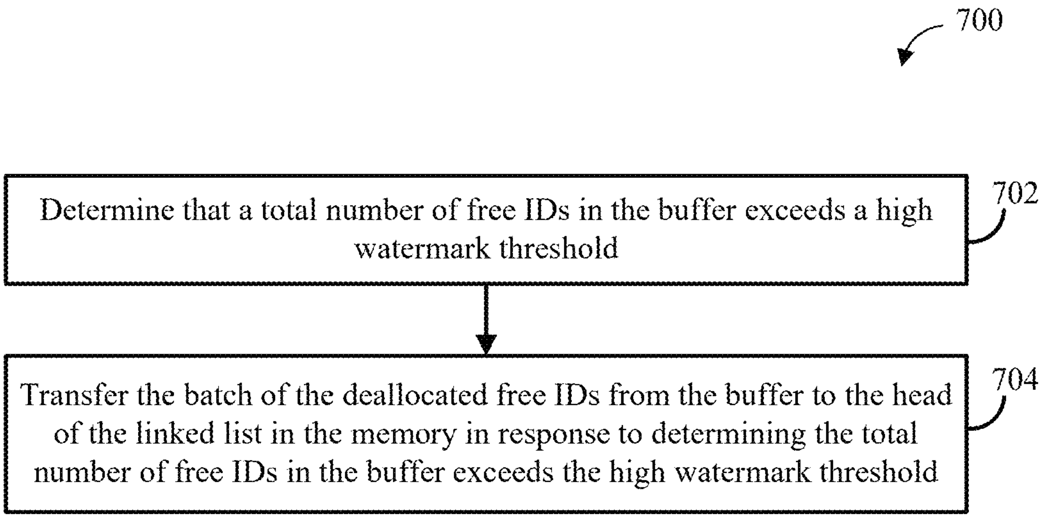
FIG. 7 shows a flowchart of a method by a hardware memory allocator for transferring a batch of deallocated free IDs from an internal buffer to a head of a linked list in external memory in accordance with an example embodiment.

FIG. 7 shows a flowchart 700 of a method by a hardware memory allocator for transferring a batch of deallocated free IDs from an internal buffer to a head of a linked list in external memory in accordance with an example embodiment. The method of flowchart 700 may represent, for example, one manner of performing step 610 of the method of flowchart 600. In an embodiment, the method of flowchart 700 is implemented by hardware memory allocator 104 of FIGS. 1 and 2. Accordingly, the method of flowchart 700 will be described with reference to FIGS. 1 and 2. Other structural and operational embodiments will be apparent to persons skilled in the relevant art(s) based on the following discussion regarding the method of flowchart 700 and hardware memory allocator 104 of FIGS. 1 and 2.

As shown in FIG. 7, the method of flowchart 700 begins at step 702 in which hardware memory allocator 104 determines that a total number of free IDs in buffer 106 exceeds a high watermark threshold. After step 702, control flows to step 704.

At step 704, in response to determining that the total number of free IDs in buffer 106 exceeds the high watermark threshold, hardware memory allocator 104 transfers the batch of the deallocated free IDs from buffer 106 to the head of the linked list in external memory 102.

Figure 8:
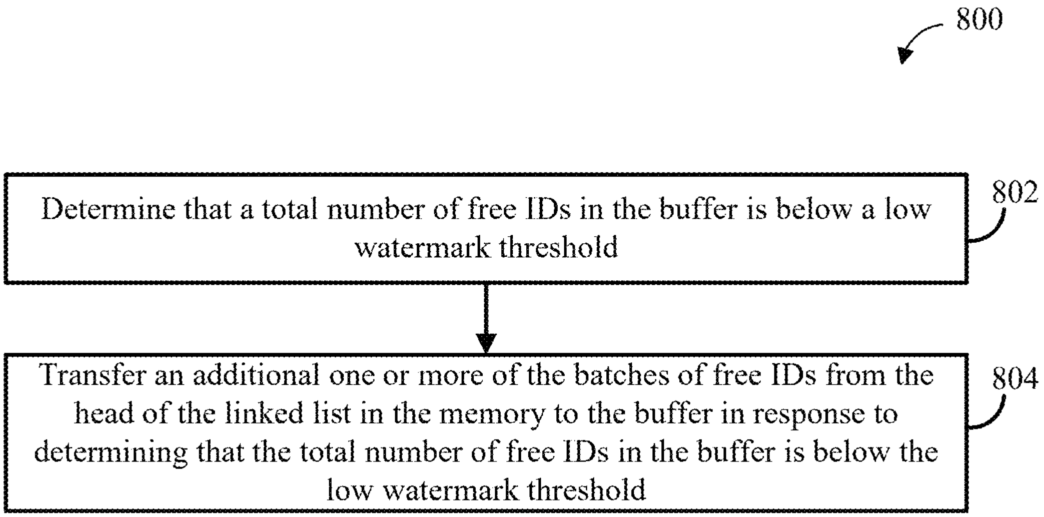
FIG. 8 shows a flowchart of a method by a hardware memory allocator for transferring additional batches of free IDs from a linked list in external memory to an internal buffer in accordance with an example embodiment.

FIG. 8 shows a flowchart 800 of a method by a hardware memory allocator for transferring additional batches of free IDs from a linked list in external memory to an internal buffer in accordance with an example embodiment. The method of flowchart 800 may be performed, for example, in addition to the steps of the method of flowchart 600. In an embodiment, the method of flowchart 800 is implemented by hardware memory allocator 104 of FIGS. 1 and 2. Accordingly, the method of flowchart 800 will be described with reference to FIGS. 1 and 2. Other structural and operational embodiments will be apparent to persons skilled in the relevant art(s) based on the following discussion regarding the method of flowchart 800 and hardware memory allocator 104 of FIGS. 1 and 2.

As shown in FIG. 8, the method of flowchart 800 begins at step 802 in which hardware memory allocator 104 determines that a total number of free IDs in buffer 106 is below a low watermark threshold. After step 802, control flows to step 804.

At step 804, in response to determining that the total number of free IDs in buffer 106 is below the low watermark threshold, hardware memory allocator 104 transfers an additional one or more batches of free IDs from the head of the linked list in external memory 102 to buffer 106.

Figure 9:
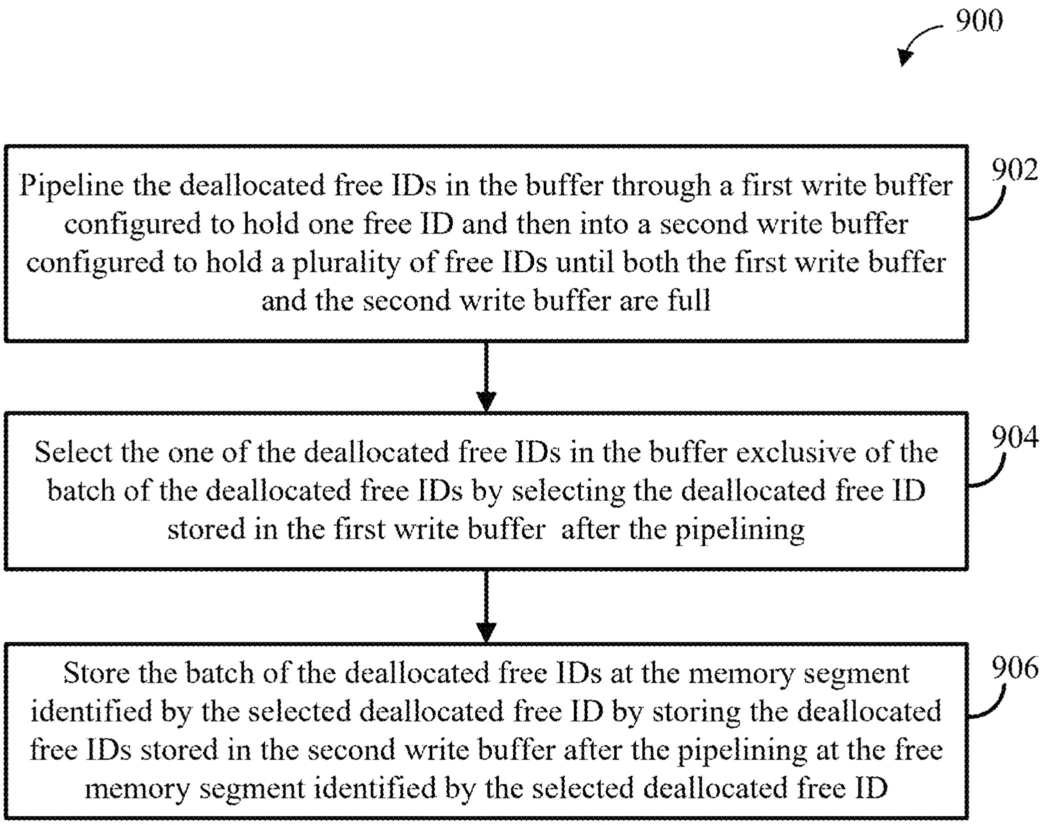
FIG. 9 shows a flowchart of a further method by a hardware memory allocator for transferring a batch of deallocated free IDs from an internal buffer to a head of a linked list in external memory in accordance with an example embodiment.

FIG. 9 shows a flowchart of a further method by a hardware memory allocator for transferring a batch of deallocated free IDs from an internal buffer to a head of a linked list in external memory in accordance with an example embodiment. The method of flowchart 900 may represent, for example, one manner of performing step 610 of the method of flowchart 600. In an embodiment, the method of flowchart 900 is implemented by hardware memory allocator 104 of FIGS. 1 and 2. Accordingly, the method of flowchart 900 will be described with reference to FIGS. 1 and 2. Other structural and operational embodiments will be apparent to persons skilled in the relevant art(s) based on the following discussion regarding the method of flowchart 900 and hardware memory allocator 104 of FIGS. 1 and 2.

As shown in FIG. 9, the method of flowchart 900 begins at step 902 in which transfer unit 108 of hardware memory allocator 104 pipelines the deallocated free IDs in buffer 106 through a first write buffer configured to hold one free ID (write buffer 202) and then into a second write buffer configured to hold a plurality of free IDs (write buffer ex 204) until both the first write buffer and the second write buffer are full. After step 902, control flows to step 904.

At step 904, transfer unit 108 selects the one of the deallocated free IDs in buffer 106 exclusive of the batch of the deallocated free IDs by selecting the deallocated free ID stored in the first write buffer (write buffer 202) after the pipelining of step 902.

At step 906, transfer unit 108 stores the batch of the deallocated free IDs at the memory segment identified by the selected deallocated free ID by storing the deallocated free IDs stored in the second write buffer (write buffer ex 204) after the pipelining at the free memory segment identified by the selected deallocated free ID.

Figure 10:
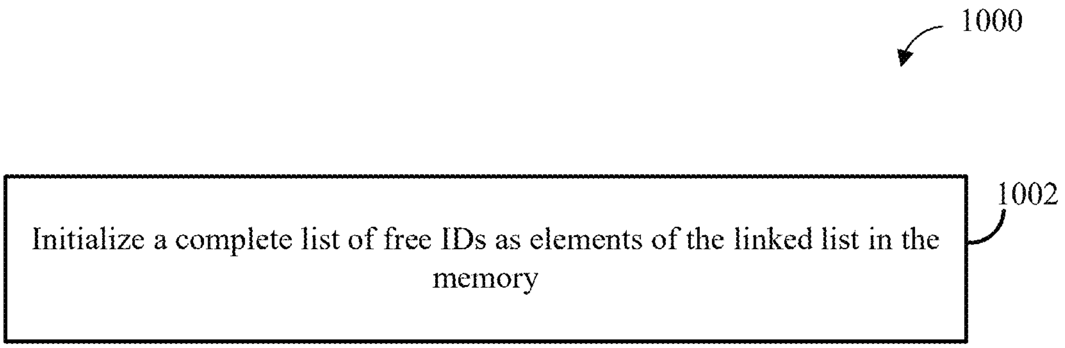
FIG. 10 shows a flowchart of a method by a hardware memory allocator for storing batches of free IDs as elements of a linked list in an external memory in accordance with an example embodiment.

FIG. 10 shows a flowchart 1000 of a method by a hardware memory allocator for storing batches of free IDs as elements of a linked list in an external memory in accordance with an example embodiment. The method of flowchart 1000 may represent, for example, one manner of performing step 602 of the method of flowchart 600. In an embodiment, the method of flowchart 1000 is implemented by hardware memory allocator 104 of FIGS. 1 and 2. Accordingly, the method of flowchart 1000 will be described with reference to FIGS. 1 and 2. Other structural and operational embodiments will be apparent to persons skilled in the relevant art(s) based on the following discussion regarding the method of flowchart 1000 and hardware memory allocator 104 of FIGS. 1 and 2.

As shown in FIG. 10, the method of flowchart 1000 includes step 1002 in which hardware memory allocator 104 initializes a complete list of free IDs as elements of the linked list in external memory 102.

Figure 11:
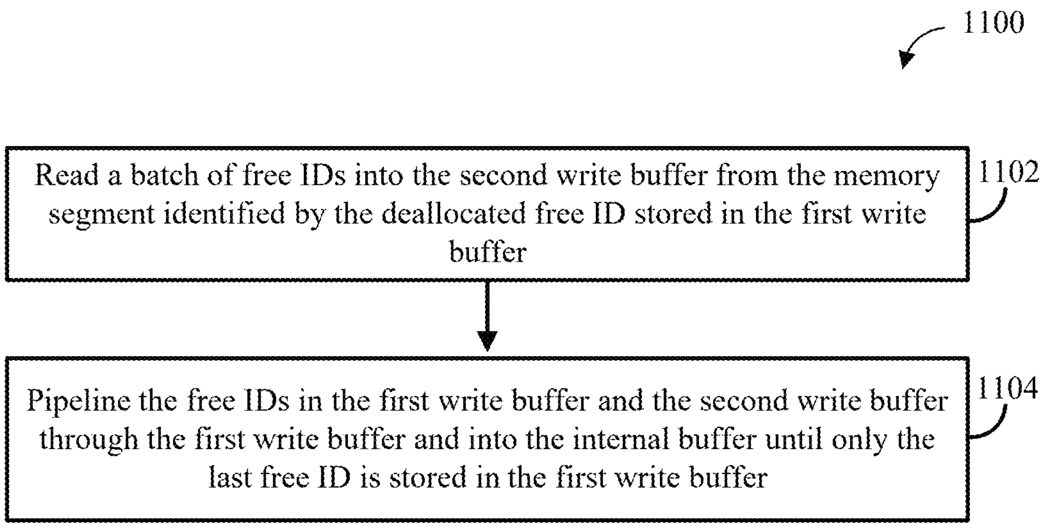
FIG. 11 shows a flowchart of a method by a hardware memory allocator for transferring a batch of free IDs from a linked list in external memory to an internal buffer in accordance with an example embodiment.

FIG. 11 shows a flowchart 1100 of a method by a hardware memory allocator for transferring a batch of free IDs from a linked list in external memory to an internal buffer in accordance with an example embodiment. The method of flowchart 1100 may represent, for example, one manner of performing step 604 of the method of flowchart 600 and/or one manner of performing step 804 of the method of flowchart 800. In an embodiment, the method of flowchart 1100 is implemented by hardware memory allocator 104 of FIGS. 1 and 2. Accordingly, the method of flowchart 1100 will be described with reference to FIGS. 1 and 2. Other structural and operational embodiments will be apparent to persons skilled in the relevant art(s) based on the following discussion regarding the method of flowchart 900 and hardware memory allocator 104 of FIGS. 1 and 2.

As shown in FIG. 11, the method of flowchart 1100 begins at step 1102 in which transfer unit 108 of hardware memory allocator 104 reads a batch of free IDs into the second write buffer (write buffer ex 204) from the memory segment identified by the deallocated free ID stored in the first write buffer (write buffer 202). After step 1102, control flows to step 1104.

At step 1104, transfer unit 108 pipelines the free IDs in the first write buffer (write buffer 202) and the second write buffer (write buffer ex 204) through the first write buffer (write buffer 202) and into buffer 106 until only the last free ID is stored in the first write buffer (write buffer 202).

Although the methods of flowcharts 600, 700, 800, 900, 1000 and 1100 were described above in reference to hardware memory allocator 104 of FIGS. 1 and 2, it is to be understood that these methods may also be performed by hardware memory allocator 304 of FIGS. 3 and 4. With respect to the embodiment of FIGS. 3 and 4, hardware memory allocator 304 may execute a separate instance of each of these methods for each memory segment size supported by hardware memory allocator 304.

III. Example Mobile Device and Computer System Implementation

Figure 12:
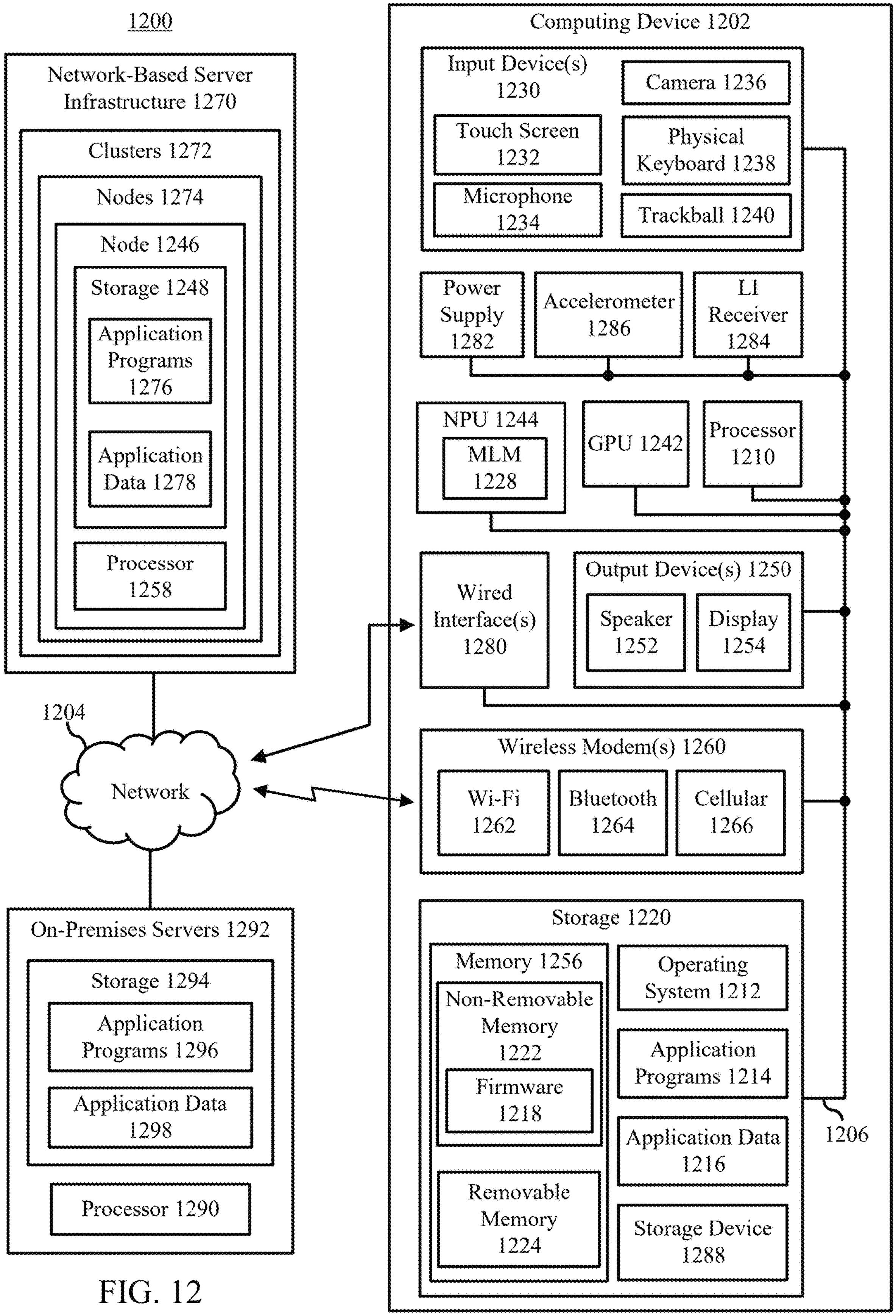
FIG. 12 shows a block diagram of an example computer system in which embodiments may be implemented.

The hardware memory allocator described above may be implemented as part of one or more computing devices that are mobile (a mobile device) and/or stationary (a stationary device). Examples of computing devices in which embodiments are implementable are described as follows with respect to FIG. 12. FIG. 12 shows a block diagram of an exemplary computing environment 1200 that includes a computing device 1202. In some embodiments, computing device 1202 is communicatively coupled with devices (not shown in FIG. 12) external to computing environment 1200 via network 1204. Network 1204 comprises one or more networks such as local area networks (LANs), wide area networks (WANs), enterprise networks, the Internet, etc. In examples, network 1204 includes one or more wired and/or wireless portions. In some examples, network 1204 additionally or alternatively includes a cellular network for cellular communications. Computing device 1202 is described in detail as follows.

Computing device 1202 can be any of a variety of types of computing devices. Examples of computing device 1202 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1202 is a stationary computing device such as a desktop computer, a personal computer (PC), a stationary server device, a minicomputer, a mainframe, a supercomputer, etc.

As shown in FIG. 12, computing device 1202 includes a variety of hardware and software components, including a processor 1210, a storage 1220, a graphics processing unit (GPU) 1242, a neural processing unit (NPU) 1244, one or more input devices 1230, one or more output devices 1250, one or more wireless modems 1260, one or more wired interfaces 1280, a power supply 1282, a location information (LI) receiver 1284, and an accelerometer 1286. Storage 1220 includes memory 1256, which includes non-removable memory 1222 and removable memory 1224, and a storage device 1288. Storage 1220 also stores an operating system 1212, application programs 1214, and application data 1216. Wireless modem(s) 1260 include a Wi-Fi modem 1262, a Bluetooth modem 1264, and a cellular modem 1266. Output device(s) 1250 includes a speaker 1252 and a display 1254. Input device(s) 1230 includes a touch screen 1232, a microphone 1234, a camera 1236, a physical keyboard 1238, and a trackball 1240. Not all components of computing device 1202 shown in FIG. 12 are present in all embodiments, additional components not shown may be present, and in a particular embodiment any combination of the components are present. In examples, components of computing device 1202 are mounted to a circuit card (e.g., a motherboard) of computing device 1202, integrated in a housing of computing device 1202, or otherwise included in computing device 1202. The components of computing device 1202 are described as follows.

In embodiments, a single processor 1210 (e.g., central processing unit (CPU), microcontroller, a microprocessor, signal processor, ASIC (application specific integrated circuit), and/or other physical hardware processor circuit) or multiple processors 1210 are present in computing device 1202 for performing such tasks as program execution, signal coding, data processing, input/output processing, power control, and/or other functions. In examples, processor 1210 is a single-core or multi-core processor, and each processor core is single-threaded or multithreaded (to provide multiple threads of execution concurrently). Processor 1210 is configured to execute program code stored in a computer readable medium, such as program code of operating system 1212 and application programs 1214 stored in storage 1220. The program code is structured to cause processor 1210 to perform operations, including the processes/methods disclosed herein. Operating system 1212 controls the allocation and usage of the components of computing device 1202 and provides support for one or more application programs 1214 (also referred to as "applications" or "apps"). In examples, application programs 1214 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1210 includes one or more general processors (e.g., CPUs) configured with or coupled to one or more hardware accelerators, such as one or more NPUs 1244 and/or one or more GPUs 1242.

Any component in computing device 1202 can communicate with any other component according to function, although not all connections are shown for ease of illustration. For instance, as shown in FIG. 12, bus 1206 is a multiple signal line communication medium (e.g., conductive traces in silicon, metal traces along a motherboard, wires, etc.) present to communicatively couple processor 1210 to various other components of computing device 1202, although in other embodiments, an alternative bus, further buses, and/or one or more individual signal lines is/are present to communicatively couple components. Bus 1206 represents one or more of any of several types of bus structures, including a memory bus or memory controller, a peripheral bus, an accelerated graphics port, and a processor or local bus using any of a variety of bus architectures.

Storage 1220 is physical storage that includes one or both of memory 1256 and storage device 1288, which store operating system 1212, application programs 1214, and application data 1216 according to any distribution. Non-removable memory 1222 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1222 includes main memory and is separate from or fabricated in a same integrated circuit as processor 1210. As shown in FIG. 12, non-removable memory 1222 stores firmware 1218 that is present to provide low-level control of hardware. Examples of firmware 1218 include BIOS (Basic Input/Output System, such as on personal computers) and boot firmware (e.g., on smart phones). In examples, removable memory 1224 is inserted into a receptacle of or is otherwise coupled to computing device 1202 and can be removed by a user from computing device 1202. Removable memory 1224 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1288 are present that are internal and/or external to a housing of computing device 1202 and are or are not removable. Examples of storage device 1288 include a hard disk drive, a SSD, a thumb drive (e.g., a USB (Universal Serial Bus) flash drive), or other physical storage device.

One or more programs are stored in storage 1220. Such programs include operating system 1212, one or more application programs 1214, and other program modules and program data. Storage 1220 also stores data used and/or generated by operating system 1212 and application programs 1214 as application data 1216. Examples of application data 1216 include web pages, text, images, tables, sound files, video data, and other data. In examples, application data 1216 is sent to and/or received from one or more network servers or other devices via one or more wired or wireless networks. Storage 1220 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1202 through one or more input devices 1230 and receives information from computing device 1202 through one or more output devices 1250. Input device(s) 1230 includes one or more of touch screen 1232, microphone 1234, camera 1236, physical keyboard 1238 and/or trackball 1240 and output device(s) 1250 includes one or more of speaker 1252 and display 1254. Each of input device(s) 1230 and output device(s) 1250 are integral to computing device 1202 (e.g., built into a housing of computing device 1202) or are external to computing device 1202 (e.g., communicatively coupled wired or wirelessly to computing device 1202 via wired interface(s) 1280 and/or wireless modem(s) 1260). Further input devices 1230 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1254 displays information, as well as operating as touch screen 1232 by receiving user commands and/or other information (e.g., by touch, finger gestures, virtual keyboard, etc.) as a user interface. Any number of each type of input device(s) 1230 and output device(s) 1250 are present, including multiple microphones 1234, multiple cameras 1236, multiple speakers 1252, and/or multiple displays 1254.

In embodiments where GPU 1242 is present, GPU 1242 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1242 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1244 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1228. In an example, NPU 1244 is configured for a data-driven parallel computing and is highly efficient at processing massive multimedia data such as videos and images and processing data for neural networks. NPU 1244 is configured for efficient handling of AI-related tasks, such as speech recognition, background blurring in video calls, photo or video editing processes like object detection, etc.

In embodiments disclosed herein that implement ML models, NPU 1244 can be utilized to execute such ML models, of which MLM 1228 is an example. For instance, where applicable, MLM 1228 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1244 is used to train MLM 1228. To train MLM 1228, training data that includes input features (attributes) and their corresponding output labels/target values (e.g., for supervised learning) is collected. A training algorithm is a computational procedure that is used so that MLM 1228 learns from the training data. Parameters/weights are internal settings of MLM 1228 that are adjusted during training by the training algorithm to reduce a difference between predictions by MLM 1228 and actual outcomes (e.g., output labels). In some examples, MLM 1228 is set with initial values for the parameters/weights. A loss function measures a dissimilarity between predictions by MLM 1228 and the target values, and the parameters/weights of MLM 1228 are adjusted to minimize the loss function. The parameters/weights are iteratively adjusted by an optimization technique, such as gradient descent. In this manner, MLM 1228 is generated through training by NPU 1244 to be used to generate inferences based on received input feature sets for particular applications. MLM 1228 is generated as a computer program or other type of algorithm configured to generate an output (e.g., a classification, a prediction/inference) based on received input features, and is stored in the form of a file or other data structure.

In examples, such training of MLM 1228 by NPU 1244 is supervised or unsupervised. According to supervised learning, input objects (e.g., a vector of predictor variables) and a desired output value (e.g., a human-labeled supervisory signal) train MLM 1228. The training data is processed, building a function that maps new data on expected output values. Example algorithms usable by NPU 1244 to perform supervised training of MLM 1228 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1228 is an LLM, MLM 1228 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1228 is trained to learn patterns from unlabeled data. For instance, in embodiments where MLM 1228 implements unsupervised learning techniques, MLM 1228 identifies one or more classifications or clusters to which an input belongs. During a training phase of MLM 1228 according to unsupervised learning, MLM 1228 tries to mimic the provided training data and uses the error in its mimicked output to correct itself (i.e., correct weights and biases). In further examples, NPU 1244 perform unsupervised training of MLM 1228 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1244 need not necessarily be present in all ML model embodiments. In embodiments where ML models are present, any one or more of processor 1210, GPU 1242, and/or NPU 1244 can be present to train and/or execute MLM 1228.

One or more wireless modems 1260 can be coupled to antenna(s) (not shown) of computing device 1202 and can support two-way communications between processor 1210 and devices external to computing device 1202 through network 1204, as would be understood to persons skilled in the relevant art(s). Wireless modem 1260 is shown generically and can include a cellular modem 1266 for communicating with one or more cellular networks, such as a GSM network for data and voice communications within a single cellular network, between cellular networks, or between the mobile device and a public switched telephone network (PSTN). In examples, wireless modem 1260 also or alternatively includes other radio-based modem types, such as a Bluetooth modem 1264 (also referred to as a "Bluetooth device") and/or Wi-Fi modem 1262 (also referred to as an "wireless adaptor"). Wi-Fi modem 1262 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1264 is configured to communicate with another Bluetooth-capable device according to the Bluetooth short-range wireless technology standard(s) such as IEEE 802.15.1 and/or managed by the Bluetooth Special Interest Group (SIG).

Computing device 1202 can further include power supply 1282, LI receiver 1284, accelerometer 1286, and/or one or more wired interfaces 1280. Example wired interfaces 1280 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1280 of computing device 1202 provide for wired connections between computing device 1202 and network 1204, or between computing device 1202 and one or more devices/peripherals when such devices/peripherals are external to computing device 1202 (e.g., a pointing device, display 1254, speaker 1252, camera 1236, physical keyboard 1238, etc.). Power supply 1282 is configured to supply power to each of the components of computing device 1202 and receives power from a battery internal to computing device 1202, and/or from a power cord plugged into a power port of computing device 1202 (e.g., a USB port, an A/C power port). LI receiver 1284 is useable for location determination of computing device 1202 and in examples includes a satellite navigation receiver such as a Global Positioning System (GPS) receiver and/or includes other type of location determiner configured to determine location of computing device 1202 based on received information (e.g., using cell tower triangulation, etc.). Accelerometer 1286, when present, is configured to determine an orientation of computing device 1202.

Note that the illustrated components of computing device 1202 are not required or all-inclusive, and fewer or greater numbers of components can be present as would be recognized by one skilled in the art. In examples, computing device 1202 includes one or more of a gyroscope, barometer, proximity sensor, ambient light sensor, digital compass, etc. In an example, processor 1210 and memory 1256 are co-located in a same semiconductor device package, such as being included together in an integrated circuit chip, FPGA, or system-on-chip (SOC), optionally along with further components of computing device 1202.

In some embodiments, server infrastructure 1270 is present in computing environment 1200 and is communicatively coupled with computing device 1202 via network 1204. Server infrastructure 1270, when present, is a network-accessible server set (e.g., a cloud-based environment or platform). As shown in FIG. 12, server infrastructure 1270 includes clusters 1272. Each of clusters 1272 comprises a group of one or more compute nodes and/or a group of one or more storage nodes. For example, as shown in FIG. 12, cluster 1272 includes nodes 1274. Each of nodes 1274 are accessible via network 1204 (e.g., in a "cloud-based" embodiment) to build, deploy, and manage applications and services. In examples, any of nodes 1274 is a storage node that comprises a plurality of physical storage disks, SSDs, and/or other physical storage devices that are accessible via network 1204 and are configured to store data associated with the applications and services managed by nodes 1274.

Each of nodes 1274, as a compute node, comprises one or more server computers, server systems, and/or computing devices. For instance, a node 1274 in accordance with an embodiment includes one or more of the components of computing device 1202 disclosed herein. Each of nodes 1274 is configured to execute one or more software applications (or "applications") and/or services and/or manage hardware resources (e.g., processors, memory, etc.), which are utilized by users (e.g., customers) of the network-accessible server set. In examples, as shown in FIG. 12, nodes 1274 includes a node 1246 that includes storage 1248 and/or one or more of a processor 1258 (e.g., similar to processor 1210, GPU 1242, and/or NPU 1244 of computing device 1202). Storage 1248 stores application programs 1276 and application data 1278. Processor(s) 1258 operate application programs 1276 which access and/or generate related application data 1278. In an implementation, nodes such as node 1246 of nodes 1274 operate or comprise one or more virtual machines, with each virtual machine emulating a system architecture (e.g., an operating system), in an isolated manner, upon which applications such as application programs 1276 are executed.

In embodiments, one or more of clusters 1272 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1272 are included in a datacenter in a distributed collection of datacenters. In embodiments, exemplary computing environment 1200 comprises part of a cloud-based platform.

In an embodiment, computing device 1202 accesses application programs 1276 for execution in any manner, such as by a client application and/or a browser at computing device 1202.

In an example, for purposes of network (e.g., cloud) backup and data security, computing device 1202 additionally and/or alternatively synchronizes copies of application programs 1214 and/or application data 1216 to be stored at network-based server infrastructure 1270 as application programs 1276 and/or application data 1278. In examples, operating system 1212 and/or application programs 1214 include a file hosting service client configured to synchronize applications and/or data stored in storage 1220 at network-based server infrastructure 1270.

In some embodiments, on-premises servers 1292 are present in computing environment 1200 and are communicatively coupled with computing device 1202 via network 1204. On-premises servers 1292, when present, are hosted within an organization's infrastructure and, in many cases, physically onsite of a facility of that organization. On-premises servers 1292 are controlled, administered, and maintained by IT (Information Technology) personnel of the organization or an IT partner to the organization. Application data 1298 can be shared by on-premises servers 1292 between computing devices of the organization, including computing device 1202 (when part of an organization) through a local network of the organization, and/or through further networks accessible to the organization (including the Internet). Furthermore, in examples, on-premises servers 1292 serve applications such as application programs 1296 to the computing devices of the organization, including computing device 1202. Accordingly, in examples, on-premises servers 1292 include storage 1294 (which includes one or more physical storage devices such as storage disks and/or SSDs) for storage of application programs 1296 and application data 1298 and include a processor 1290 (e.g., similar to processor 1210, GPU 1242, and/or NPU 1244 of computing device 1202) for execution of application programs 1296. In some embodiments, multiple processors 1290 are present for execution of application programs 1296 and/or for other purposes. In further examples, computing device 1202 is configured to synchronize copies of application programs 1214 and/or application data 1216 for backup storage at on-premises servers 1292 as application programs 1296 and/or application data 1298.

Embodiments described herein may be implemented in one or more of computing device 1202, network-based server infrastructure 1270, and on-premises servers 1292. For example, in some embodiments, computing device 1202 is used to implement systems, clients, or devices, or components/subcomponents thereof, disclosed elsewhere herein. In other embodiments, a combination of computing device 1202, network-based server infrastructure 1270, and/or on-premises servers 1292 is used to implement systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 1220. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1214) are stored in storage 1220. Such computer programs can also be received via wired interface(s) 1260 and/or wireless modem(s) 1260 over network 1204. Such computer programs, when executed or loaded by an application, enable computing device 1202 to implement various features. Accordingly, such computer programs represent controllers of the computing device 1202.

Computer program products may comprise computer code or instructions stored on any computer-readable medium or computer-readable storage medium. Such computer program products include the physical storage of storage 1220 as well as further physical storage types.

IV. Additional Example Embodiments

A method for allocating memory by a hardware memory allocator of a compute system is disclosed herein. The method comprises: storing batches of free identifiers (IDs) as elements of a linked list in a memory external to the compute system, each free ID identifying a respective memory segment of the memory; transferring one or more of the batches of free IDs from a head of the linked list in the memory to a buffer within the hardware memory allocator; in response to memory allocation requests received from one or more requestors within the compute system, allocating free IDs from among the one or more batches of free IDs in the buffer to the one or more requestors; in response to memory de-allocation requests received from the one or more requestors, de-allocating the previously-allocated free IDs; and transferring a batch of the deallocated free IDs from the buffer to the head of the linked list in the memory by: selecting one of the deallocated free IDs in the buffer exclusive of the batch of the deallocated free IDs; and storing the batch of the deallocated free IDs at the memory segment identified by the selected deallocated free ID.

In one implementation of the foregoing method, transferring the batch of the deallocated free IDs from the buffer to the head of the linked list in the memory comprises: determining that a total number of free IDs in the buffer exceeds a high watermark threshold; and transferring the batch of the deallocated free IDs from the buffer to the head of the linked list in the memory in response to determining that the total number of free IDs in the buffer exceeds the high watermark threshold.

In another implementation of the foregoing method, the method further comprises: determining that a total number of free IDs in the buffer is below a low watermark threshold; and in response to determining that the total number of free IDs in the buffer is below the low watermark threshold, transferring an additional one or more of the batches of free IDs from the head of the linked list in the memory to the buffer.

In another implementation of the foregoing method, storing the batches of free IDs as elements of the linked list in the memory external to the compute system comprises: storing the batches of free IDs as elements of the linked list in a dynamic random access memory (DRAM) external to the compute system.

In another implementation of the foregoing method, transferring the one or more batches of free IDs from the head of the linked list in the memory to the buffer comprises: transferring the one or more batches of free IDs from the head of the linked list in the memory to a block random access memory (BRAM).

In another implementation of the foregoing method, transferring the batch of the deallocated free IDs from the buffer to the head of the linked list in the memory further comprises pipelining the deallocated free IDs in the buffer first through a first write buffer configured to hold one free ID and then into a second write buffer configured to hold a plurality of free IDs until both the first write buffer and the second write buffer are full; selecting the one of the deallocated free IDs in the buffer exclusive of the batch of the deallocated free IDs comprises selecting the deallocated free ID stored in the first write buffer after the pipelining; and storing the batch of the deallocated free IDs at the memory segment identified by the selected deallocated free ID comprises writing the deallocated free IDs stored in the second write buffer after the pipelining to the free memory segment identified by the selected deallocated free ID.

In another implementation of the foregoing method, storing the batches of free IDs as elements of the linked list in the memory comprises: initializing a complete list of free IDs as elements of the linked list in the memory.

A hardware memory allocator of a compute system is disclosed herein. The hardware memory allocator comprises a buffer and a transfer unit. The transfer unit is configured to store batches of free identifiers (IDs) as nodes of a linked list in a memory external to the compute system, each free ID identifying a respective memory segment of the memory, and transfer one or more of the batches of free IDs from a head of the linked list in the memory to the buffer. The buffer is configured to allocate free IDs from among the one or more batches of free IDs in the buffer to one or more requestors within the compute system in response to memory allocation requests received from the one or more requestors, and de-allocate the previously-allocated free IDs in response to memory de-allocation requests received from the one or more requestors. The transfer unit is further configured to transfer a batch of the deallocated free IDs from the buffer to the head of the linked list in memory by at least selecting one of the deallocated free IDs in the buffer exclusive of the batch of the deallocated free IDs and storing the batch of the deallocated free IDs at the memory segment identified by the selected deallocated free ID.

In one implementation of the foregoing hardware memory allocator, the transfer unit is configured to transfer the batch of the deallocated free IDs from the buffer to the head of the linked list in the memory by: determining that a total number of free IDs in the buffer exceeds a high watermark threshold; and transferring the batch of the deallocated free IDs from the buffer to the head of the linked list in the memory in response to determining that the total number of free IDs in the buffer exceeds the high watermark threshold.

In another implementation of the foregoing hardware memory allocator, the transfer unit is further configured to: determine that a total number of free IDs in the buffer is below a low watermark threshold; and in response to determining that the total number of free IDs in the buffer is below the low watermark threshold, transfer an additional one or more of the batches of free IDs from the head of the linked list in the memory to the buffer.

In another implementation of the foregoing hardware memory allocator, the memory external to the hardware compute system comprises a dynamic random access memory (DRAM).

In another implementation of the foregoing hardware memory allocator, the buffer comprises a block random access memory (BRAM).

In another implementation of the foregoing hardware memory allocator, the transfer unit comprises a first write buffer configured to hold one free ID and a second write buffer configured to hold a plurality of free IDs, the transfer unit is further configured to transfer the batch of the deallocated free IDs from the buffer to the head of the linked list in the memory by pipelining the deallocated free IDs in the buffer first through the first write buffer and then into the second write buffer until both the first write buffer and the second write buffer are full, the transfer unit is configured to select the one of the deallocated free IDs in the buffer exclusive of the batch of the deallocated free IDs by selecting the deallocated free ID stored in the first write buffer after the pipelining, and the transfer unit is configured to store the batch of the deallocated free IDs at the free memory segment identified by the selected deallocated free ID by writing the deallocated free IDs stored in the second write buffer after the pipelining to the memory segment identified by the selected deallocated free ID.

In another implementation of the foregoing hardware memory allocator, the transfer unit is configured to store the batches of free IDs as nodes of the linked list in the memory by initializing a complete list of free IDs as nodes of the linked list in the memory.

A system is disclosed herein. The system comprises a memory and a compute system connected to the memory. The compute system comprises one or more requestors and a hardware memory allocator. The hardware memory allocator comprises a buffer and a transfer unit. The transfer unit is configured to store batches of free identifiers (IDs) as elements of a linked list in the memory, each free ID identifying a respective memory segment of the memory and transfer one or more of the batches of free IDs from a head of the linked list in the memory to the buffer. The buffer is configured to allocate free IDs from among the one or more batches of free IDs in the buffer to the one or more requestors in response to memory allocation requests received from the one or more requestors and de-allocate the previously-allocated free IDs in response to memory de-allocation requests received from the one or more requestors. The transfer unit is further configured to transfer a batch of the deallocated free IDs from the buffer to the head of the linked list in memory by at least: selecting one of the deallocated free IDs in the buffer exclusive of the batch of the deallocated free IDs and storing the batch of the deallocated free IDs at the memory segment identified by the selected deallocated free ID.

In one implementation of the foregoing system, the transfer unit is configured to transfer the batch of the deallocated free IDs from the buffer to the head of the linked list in memory by: determining that a total number of free IDs in the buffer exceeds a high watermark threshold; and transferring the batch of the deallocated free IDs from the buffer to the head of the linked list in the memory in response to determining that the total number of free IDs in the buffer exceeds the high watermark threshold.

In another implementation of the foregoing system, the transfer unit is further configured to: determine that a total number of free IDs in the buffer is below a low watermark threshold; and in response to determining that the total number of free IDs in the buffer is below the low watermark threshold, transfer an additional one or more of the batches of free IDs from the head of the linked list in the memory to the buffer.

In another implementation of the foregoing system, the memory comprises a dynamic random access memory (DRAM).

In another implementation of the foregoing system, the buffer comprises a block random access memory (BRAM).

In another implementation of the foregoing system, the transfer unit comprises a first write buffer configured to hold one free ID and a second write buffer configured to hold a plurality of free IDs, the transfer unit is further configured to transfer the batch of the deallocated free IDs from the buffer to the head of the linked list in the memory by pipelining the deallocated free IDs in the buffer first through the first write buffer and then into the second write buffer until both the first write buffer and the second write buffer are full, the transfer unit is configured to select the one of the deallocated free IDs in the buffer exclusive of the batch of the deallocated free IDs by selecting the deallocated free ID stored in the first write buffer after the pipelining, and the transfer unit is configured to store the batch of the deallocated free IDs at the free memory segment identified by the selected deallocated free ID by writing the deallocated free IDs stored in the second write buffer after the pipelining to the free memory segment identified by the selected deallocated free ID.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" and/or "in response to" are used to indicate an effect being a result of an indicated cause, it is to be understood that the effect is not required to only result from the indicated cause, but that any number of possible additional causes may also contribute to the effect. Thus, as used herein, the terms "based on" and "in response to" should be understood to be equivalent to the term "based at least on" and "at least in response to," respectively.

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A method for allocating memory by a hardware memory allocator of a compute system, comprising:

- storing batches of free identifiers (IDs) as elements of a linked list in a memory external to the compute system, each free ID identifying a respective memory segment of the memory;
- transferring one or more of the batches of free IDs from a head of the linked list in the memory to a buffer within the hardware memory allocator;
- in response to memory allocation requests received from one or more requestors within the compute system, allocating free IDs from among the one or more batches of free IDs in the buffer to the one or more requestors;
- in response to memory de-allocation requests received from the one or more requestors, de-allocating the previously-allocated free IDs; and
- transferring a batch of the deallocated free IDs from the buffer to the head of the linked list in the memory by:
  - selecting one of the deallocated free IDs in the buffer exclusive of the batch of the deallocated free IDs; and
  - storing the batch of the deallocated free IDs at the memory segment identified by the selected deallocated free ID.

2. The method of claim 1, wherein transferring the batch of the deallocated free IDs from the buffer to the head of the linked list in the memory comprises:

- determining that a total number of free IDs in the buffer exceeds a high watermark threshold; and
- transferring the batch of the deallocated free IDs from the buffer to the head of the linked list in the memory in response to determining that the total number of free IDs in the buffer exceeds the high watermark threshold.

3. The method of claim 1, further comprising:

- determining that a total number of free IDs in the buffer is below a low watermark threshold; and
- in response to determining that the total number of free IDs in the buffer is below the low watermark threshold, transferring an additional one or more of the batches of free IDs from the head of the linked list in the memory to the buffer.

4. The method of claim 1, wherein storing the batches of free IDs as elements of the linked list in the memory external to the compute system comprises:

- storing the batches of free IDs as elements of the linked list in a dynamic random access memory (DRAM) external to the compute system.

5. The method of claim 1, wherein transferring the one or more batches of free IDs from the head of the linked list in the memory to the buffer comprises:

- transferring the one or more batches of free IDs from the head of the linked list in the memory to a block random access memory (BRAM).

6. The method of claim 1, wherein transferring the batch of the deallocated free IDs from the buffer to the head of the linked list in the memory further comprises:

- pipelining the deallocated free IDs in the buffer first through a first write buffer configured to hold one free ID and then into a second write buffer configured to hold a plurality of free IDs until both the first write buffer and the second write buffer are full;

wherein selecting the one of the deallocated free IDs in the buffer exclusive of the batch of the deallocated free IDs comprises selecting the deallocated free ID stored in the first write buffer after the pipelining; and wherein storing the batch of the deallocated free IDs at the memory segment identified by the selected deallocated free ID comprises writing the deallocated free IDs stored in the second write buffer after the pipelining to the free memory segment identified by the selected deallocated free ID.

7. The method of claim 1, wherein storing the batches of free IDs as elements of the linked list in the memory comprises:

initializing a complete list of free IDs as elements of the linked list in the memory.

8. A hardware memory allocator of a compute system, comprising:

a buffer; and a transfer unit configured to:

store batches of free identifiers (IDs) as nodes of a linked list in a memory external to the compute system, each free ID identifying a respective memory segment of the memory; and transfer one or more of the batches of free IDs from a head of the linked list in the memory to the buffer;

the buffer being configured to:

allocate free IDs from among the one or more batches of free IDs in the buffer to one or more requestors within the compute system in response to memory allocation requests received from the one or more requestors; and de-allocate the previously-allocated free IDs in response to memory de-allocation requests received from the one or more requestors; and the transfer unit being further configured to transfer a batch of the deallocated free IDs from the buffer to the head of the linked list in memory by at least:

selecting one of the deallocated free IDs in the buffer exclusive of the batch of the deallocated free IDs; and storing the batch of the deallocated free IDs at the memory segment identified by the selected deallocated free ID.

9. The hardware memory allocator of claim 8, wherein the transfer unit is configured to transfer the batch of the deallocated free IDs from the buffer to the head of the linked list in the memory by:

determining that a total number of free IDs in the buffer exceeds a high watermark threshold; and transferring the batch of the deallocated free IDs from the buffer to the head of the linked list in the memory in response to determining that the total number of free IDs in the buffer exceeds the high watermark threshold.

10. The hardware memory allocator of claim 8, wherein the transfer unit is further configured to:

determine that a total number of free IDs in the buffer is below a low watermark threshold; and in response to determining that the total number of free IDs in the buffer is below the low watermark threshold, transfer an additional one or more of the batches of free IDs from the head of the linked list in the memory to the buffer.

11. The hardware memory allocator of claim 8, wherein the memory external to the hardware compute system comprises a dynamic random access memory (DRAM).

12. The hardware memory allocator of claim 8, wherein the buffer comprises a block random access memory (BRAM).

13. The hardware memory allocator of claim 8, wherein the transfer unit comprises:

a first write buffer configured to hold one free ID; and a second write buffer configured to hold a plurality of free IDs;

wherein the transfer unit is further configured to transfer the batch of the deallocated free IDs from the buffer to the head of the linked list in the memory by pipelining the deallocated free IDs in the buffer first through the first write buffer and then into the second write buffer until both the first write buffer and the second write buffer are full;

wherein the transfer unit is configured to select the one of the deallocated free IDs in the buffer exclusive of the batch of the deallocated free IDs by selecting the deallocated free ID stored in the first write buffer after the pipelining; and wherein the transfer unit is configured to store the batch of the deallocated free IDs at the free memory segment identified by the selected deallocated free ID by writing the deallocated free IDs stored in the second write buffer after the pipelining to the memory segment identified by the selected deallocated free ID.

14. The hardware memory allocator of claim 8, wherein the transfer unit is configured to store the batches of free IDs as nodes of the linked list in the memory by:

initializing a complete list of free IDs as nodes of the linked list in the memory.

15. A system comprising:

a memory;

a compute system connected to the memory, the compute system comprising:

one or more requestors; and a hardware memory allocator, wherein the hardware memory allocator comprises:

a buffer; and a transfer unit configured to:

store batches of free identifiers (IDs) as elements of a linked list in the memory, each free ID identifying a respective memory segment of the memory; and transfer one or more of the batches of free IDs from a head of the linked list in the memory to the buffer;

the buffer being configured to:

allocate free IDs from among the one or more batches of free IDs in the buffer to the one or more requestors in response to memory allocation requests received from the one or more requestors; and de-allocate the previously-allocated free IDs in response to memory de-allocation requests received from the one or more requestors; and the transfer unit being further configured to transfer a batch of the deallocated free IDs from the buffer to the head of the linked list in memory by at least:

selecting one of the deallocated free IDs in the buffer exclusive of the batch of the deallocated free IDs; and storing the batch of the deallocated free IDs at the memory segment identified by the selected deallocated free ID.

16. The system of claim 15, wherein the transfer unit is configured to transfer the batch of the deallocated free IDs from the buffer to the head of the linked list in memory by:

determining that a total number of free IDs in the buffer exceeds a high watermark threshold; and transferring the batch of the deallocated free IDs from the buffer to the head of the linked list in the memory in response to determining that the total number of free IDs in the buffer exceeds the high watermark threshold.

17. The system of claim 15, wherein the transfer unit is further configured to:

determine that a total number of free IDs in the buffer is below a low watermark threshold; and in response to determining that the total number of free IDs in the buffer is below the low watermark threshold, transfer an additional one or more of the batches of free IDs from the head of the linked list in the memory to the buffer.

18. The system of claim 15, wherein the memory comprises a dynamic random access memory (DRAM).

19. The system of claim 15, wherein the buffer comprises a block random access memory (BRAM).

20. The system of claim 15, wherein the transfer unit comprises:

a first write buffer configured to hold one free ID; and a second write buffer configured to hold a plurality of free IDs;

wherein the transfer unit is further configured to transfer the batch of the deallocated free IDs from the buffer to the head of the linked list in the memory by pipelining the deallocated free IDs in the buffer first through the first write buffer and then into the second write buffer until both the first write buffer and the second write buffer are full;

wherein the transfer unit is configured to select the one of the deallocated free IDs in the buffer exclusive of the batch of the deallocated free IDs by selecting the deallocated free ID stored in the first write buffer after the pipelining; and wherein the transfer unit is configured to store the batch of the deallocated free IDs at the free memory segment identified by the selected deallocated free ID by writing the deallocated free IDs stored in the second write buffer after the pipelining to the free memory segment identified by the selected deallocated free ID.

* * * * *